(12) United States Patent
Morgan

(10) Patent No.: US 9,182,030 B2
(45) Date of Patent: Nov. 10, 2015

(54) SLEW DRIVE GEARBOX WITH SPHERICAL ADJUSTING MOUNT

(71) Applicant: Brent Morgan, Phoenix, AZ (US)

(72) Inventor: Brent Morgan, Phoenix, AZ (US)

( * ) Notice: Subject to any disclaimer, the term of this patent is extended or adjusted under 35 U.S.C. 154(b) by 0 days.

(21) Appl. No.: 14/496,193

(22) Filed: Sep. 25, 2014

(65) Prior Publication Data

US 2015/0082941 A1 Mar. 26, 2015

Related U.S. Application Data

(60) Provisional application No. 61/883,124, filed on Sep. 26, 2013.

(51) Int. Cl.
| | |
|---|---|
| *F16M 1/00* | (2006.01) |
| *F16H 57/02* | (2012.01) |
| *F16H 57/025* | (2012.01) |
| *F16H 57/039* | (2012.01) |

(52) U.S. Cl.
CPC .............. *F16H 57/02* (2013.01); *F16H 57/025* (2013.01); *F16H 57/039* (2013.01); *F16H 2057/02039* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,729,590 B2* | 5/2004 | Gabriel | ....................... | 248/188.2 |
| 7,252,084 B2* | 8/2007 | Pawlenko et al. | ............. | 126/605 |
| 7,531,741 B1* | 5/2009 | Melton et al. | ................. | 136/246 |
| 8,378,281 B2* | 2/2013 | Kats et al. | ................... | 250/203.4 |
| 8,459,249 B2* | 6/2013 | Corio | ............... | 126/600 |
| 8,939,648 B2* | 1/2015 | Schneider et al. | ............ | 384/428 |
| 2005/0284467 A1* | 12/2005 | Patterson | ....................... | 126/580 |
| 2008/0011288 A1* | 1/2008 | Olsson | .......................... | 126/576 |
| 2011/0041834 A1* | 2/2011 | Liao | ............... | 126/605 |
| 2011/0240006 A1* | 10/2011 | Linke et al. | ..................... | 126/600 |
| 2011/0253195 A1* | 10/2011 | Kim | ............... | 136/246 |
| 2011/0289750 A1* | 12/2011 | Kats et al. | ....................... | 29/428 |
| 2012/0160991 A1* | 6/2012 | Kats et al. | ................... | 250/203.4 |
| 2013/0133719 A1* | 5/2013 | Huang | .......................... | 136/246 |
| 2013/0239722 A1* | 9/2013 | Vollner et al. | ................... | 74/416 |
| 2014/0090263 A1* | 4/2014 | Barton | ............................ | 33/645 |
| 2015/0069759 A1* | 3/2015 | Aranovich et al. | ............. | 290/52 |
| 2015/0082923 A1* | 3/2015 | Morgan | ....................... | 74/89.14 |
| 2015/0082924 A1* | 3/2015 | Morgan | ....................... | 74/89.14 |

* cited by examiner

*Primary Examiner* — Monica Millner
(74) *Attorney, Agent, or Firm* — Robert A. Parsons; Michael W. Goltry; Parsons & Goltry

(57) ABSTRACT

A slew drive with mounting structure includes a slew drive having a housing with a bottom side. A mounting structure includes a plate assembly coupled to the bottom side of the housing. A bottom surface of the plate assembly is formed as a convex surface forming a sphere section. A base plate has a concave top surface adjustably receiving the sphere section of the bottom surface of the plate assembly and a convex bottom surface. A post coupling is carried by the base plate for coupling the base plate to a post. A clamp ring has a central opening receiving the post coupling therethrough and has a concave top surface adjustably receiving the convex bottom surface of the base plate. Fasteners couple the plate assembly and clamp ring and are movable between a clamp position and an unclamped position.

14 Claims, 6 Drawing Sheets

SLEW DRIVE GEARBOX WITH SPHERICAL ADJUSTING MOUNT

CROSS-REFERENCE TO RELATED APPLICATION

This application claims the benefit of U.S. Provisional Application No. 61/883,124, filed 26 Sep. 2013.

FIELD OF THE INVENTION

This invention relates to slew drive devices.

More particularly, the present invention relates to mounting slew drives.

BACKGROUND OF THE INVENTION

In the field of drive systems, and in particularly slewing drives, the ability to attach a slew drive to a post is needed. The problem often encountered with mounting a slew drive is to make sure the drive is mounted square and level or aligned with multiple other slew drives. This can be difficult, requiring the base to which the drive is attached to be square and level itself. Posts or pillars carrying a slew drive must therefore be formed or positioned with great precision. This can be difficult and time consuming during the installation process, increasing complexity, installation time and cost.

Field misalignment of a slew drive creates tension in the entire system. The tension will cause fatigue and result in damage to the system over a reduced period of time. Furthermore, installation time for work crews trying to align post for slewing drives to solar array in the field is greatly increased. Alignment and/or leveling of drives is typically accomplished by the machining of specialty adjustment pieces such as ovular holes, shims, washers, and other incremental fit-up pieces.

It would be highly advantageous, therefore, to remedy the foregoing and other deficiencies inherent in the prior art.

An object of the present invention is to provide a new and improved slew drive with spherical adjusting mount.

Another object of the invention is to provide a slewing mechanism mount which allows for making adjustments to square and level or align a mounted slew drive.

Yet another object of the present invention is to provide a slew drive mount which can be adjusted so that posts can be driven into the ground quicker without as much time spent on assuring their perpendicularity to the ground.

SUMMARY OF THE INVENTION

Briefly, to achieve the desired objects and advantages of the instant invention provided is a slew drive with mounting structure including a slew drive having a housing with a bottom side. A mounting structure including a plate assembly is coupled to the bottom side of the housing. The plate assembly has a bottom surface formed as a convex surface forming a sphere section. A base plate has a concave top surface defining a sphere section substantially matching the sphere section of the bottom surface of the plate assembly and adjustably receiving the sphere section of the bottom surface of the plate assembly. The base plate further includes a convex bottom surface defining a sphere section. A post coupling is carried by the base plate for coupling the base plate to a post. A clamp ring includes a central opening receiving the post coupling therethrough and has a concave top surface defining a sphere section substantially matching the sphere section of the bottom surface of the base plate. The concave top surface of the clamp ring adjustably receives the sphere section of the bottom surface of the base plate. Fasteners couple the plate assembly and clamp ring. The fasteners are movable between a clamp position preventing relative movement between the plate assembly, the clamp ring, and the base plate, and an unclamped position permitting relative movement between the plate assembly and the clamp ring, and the base plate.

In a specific aspect, the plate assembly includes a plate having a bottom surface and a form element having a top coupled to the bottom surface of the plate. The form element includes the bottom surface of the plate assembly formed as a convex surface forming a sphere section. Thus, the plate can be the plate assembly including a bottom surface thereof being a convex surface forming a sphere section, or the plate assembly can be a plate and a form element, wherein the form element includes a bottom surface being the convex surface forming a sphere section In yet a further aspect, the fasteners include apertures formed in the plate, apertures formed in the form element aligned with the apertures formed in the plate, cut-outs formed in the base plate and adjustably aligned with the apertures formed in the form element, and apertures formed in the ring clamp adjustably aligned with the cut-outs. Fastening members extend concurrently therethrough. The cut-outs formed in the base plate are formed in opposing sides of the periphery of the base plate and have a diameter larger than the diameter of the fastening members. The larger diameter permits adjustment of the base plate relative the plate assembly and the ring clamp.

BRIEF DESCRIPTION OF THE DRAWINGS

The foregoing and further and more specific objects and advantages of the invention will become readily apparent to those skilled in the art from the following detailed description of a preferred embodiment thereof, taken in conjunction with the drawings in which.

DETAILED DESCRIPTION OF A PREFERRED EMBODIMENT

Figure 1:
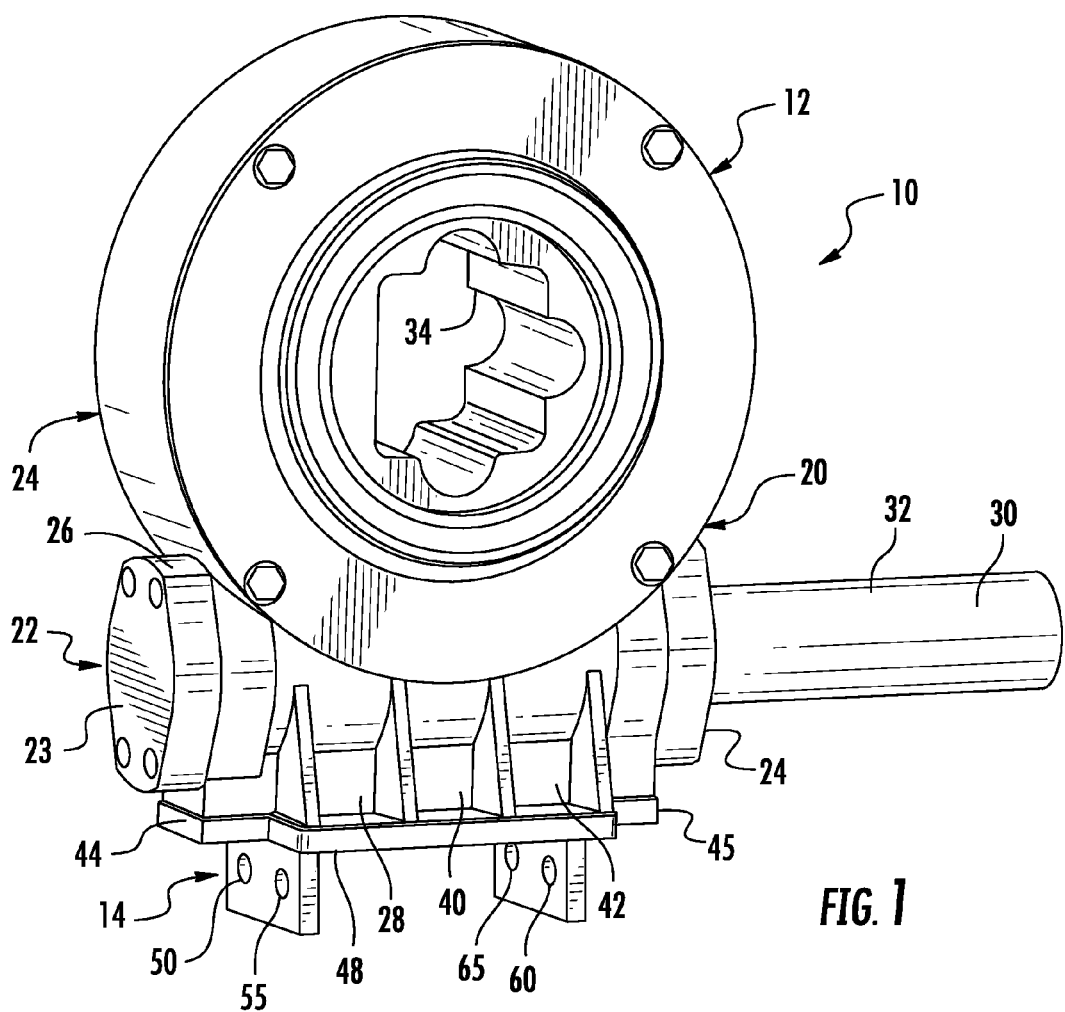
FIG. 1 is a perspective view of a slew drive assembly according to the present invention.
Figure 2:
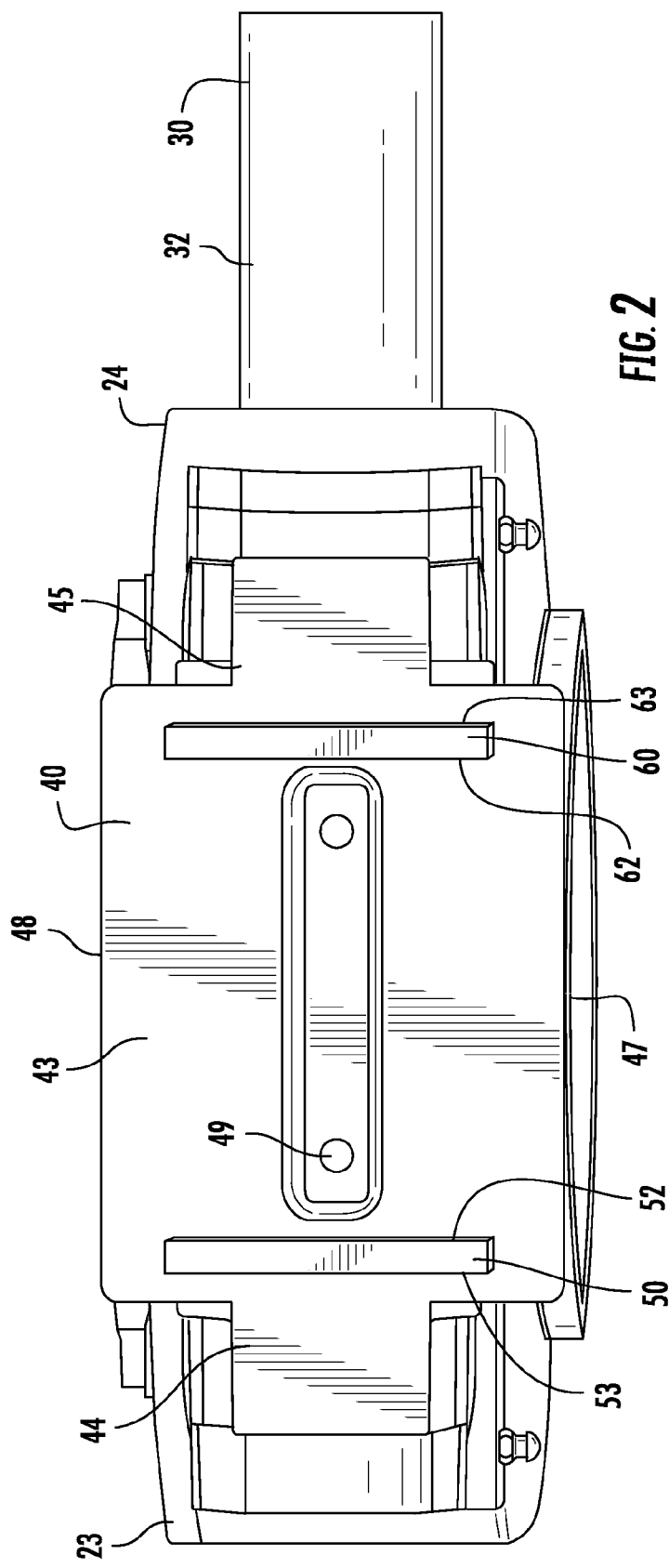
FIG. 2 is a bottom side view of the slew drive assembly of FIG. 1.

Turning now to the drawings in which like reference characters indicate corresponding elements throughout the several views, attention is directed to FIGS. 1 and 2 which illustrate a slew drive assembly generally designated 10. Slew drive assembly 10 includes a slew drive 12 and a mounting structure 14. Slew drive 12 has been described in detail in co-pending application entitled "SLEW DRIVE GEARBOX WITH TORQUE TUBE" Ser. No. 14/489,462, filed Sep. 17, 2014 and incorporated herein by reference. Slew drive 12 includes a housing 20 having a tubular portion 22 and an annular portion 24. Tubular portion 22 has opposing ends 23 and 24, a top side 26 joined with annular portion 24, and a bottom side 28 opposite top side 26. A drive motor 30 is coupled to an hourglass shaped worm thread (not shown), by a planetary gear assembly 32. Planetary gear assembly 32 is not described or shown in detail, as these assemblies are well known in the art. The worm thread is carried within tubular portion 22, and a portion thereof extends into annular portion 24. Drive motor 30 drives the worm thread which, in turn, drives a torque tube 34 carried by annular portion 24.

Still referring to FIGS. 1 and 2, mounting structure 14 is carried by bottom side 28 of tubular portion 22. Mounting structure 14 includes a plate 40 having a top surface 42 a bottom surface 43, opposing ends 44 and 45, and opposing sides 47 and 48. Plate 40 is positioned with top surface 42 overlying bottom side 28. Sides 47 and 48 extend along the length of tubular portion 22 and terminate at ends 44 and 45 proximate ends 23 and 24, respectively. Plate 40 is attached to bottom side 28 of tubular portion 22 with fasteners 49 such as bolts, screws, adhesives, welds and the like. It is also contemplated that plate 40 and the entire mounting structure 14 can be fabricated as an integral portion of housing 20.

Mounting structure 14 further includes a flange 50 extending perpendicularly outwardly from bottom surface 43. Flange 50 extends from proximate side 47 to proximate side 48, spaced from end 23, and includes an inwardly facing surface 52 and an outwardly facing surface 53. Apertures 55 extend through flange 50 from inwardly facing surface 52 to outwardly facing surface 53. Mounting structure 14 also includes a flange 60 extending perpendicularly outwardly from bottom surface 43 parallel to as spaced apart from flange 50. Flange 60 extends from proximate side 47 to proximate side 48, spaced from end 24, and includes an inwardly facing surface 62 and an outwardly facing surface 63. Apertures 65 extend through flange 60 from inwardly facing surface 62 to outwardly facing surface 63.

Figure 3:
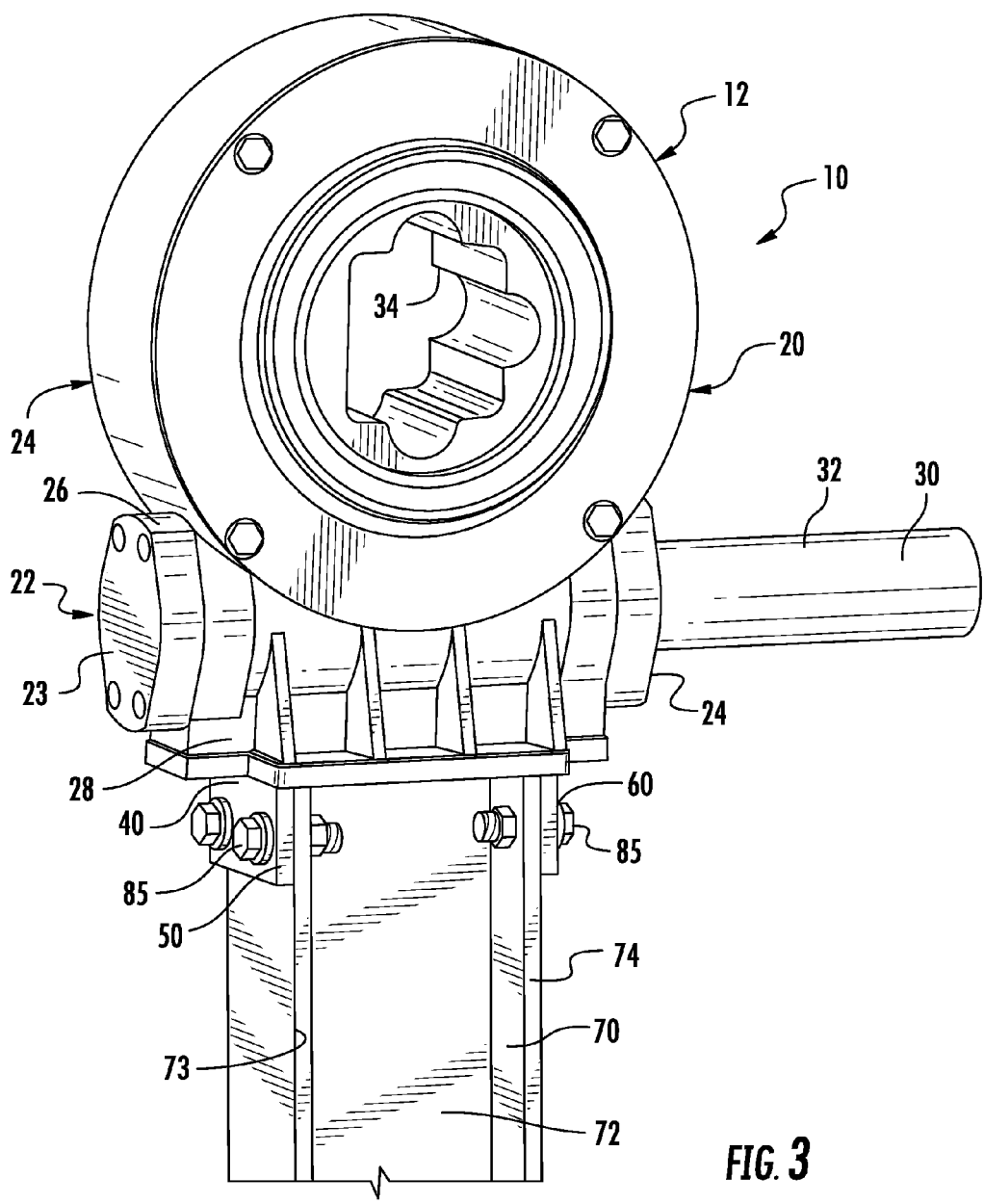
FIG. 3 is a perspective side view of a slew drive assembly of FIG. 1, mounted to an I-beam.
Figure 4:
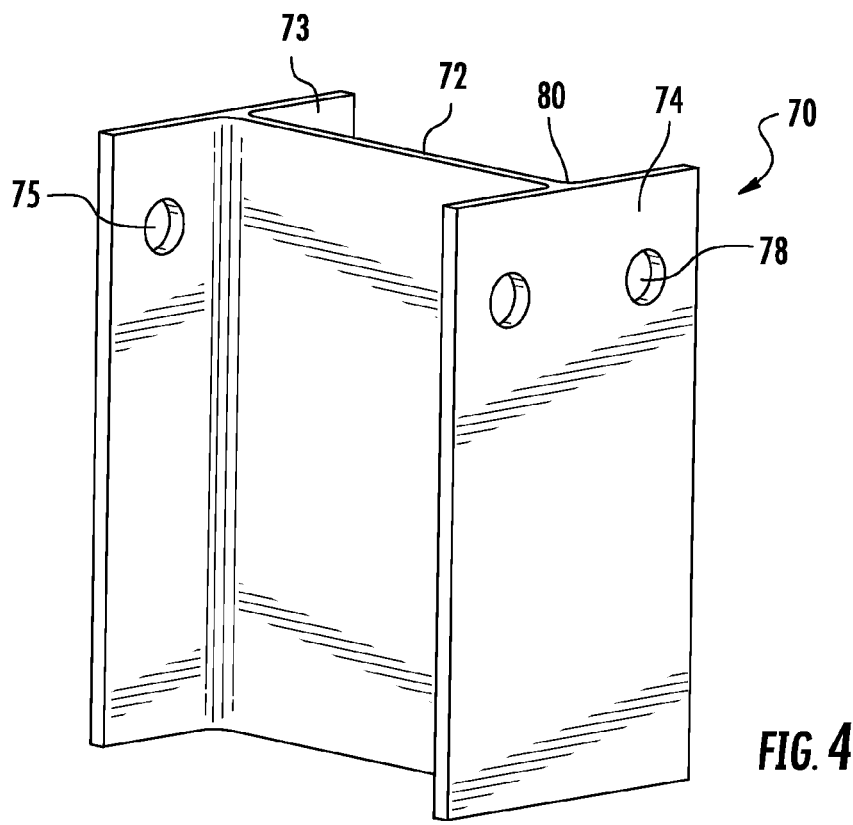
FIG. 4 is a perspective view of an I-beam to which the slew drive assembly is mounted.

Referring now to FIGS. 3 and 4, slew drive assembly 10 is mounted to an I-beam 70. Referring specifically to FIG. 4, I-beam 70 includes a central web 72 and opposing side flanges 73 and 74 extending the length of opposing edges thereof. Apertures 75 are formed through flange 73 on opposing sides of web 72, and apertures 78 are formed through flange 74 on opposing sides of web 72 at a terminal end 80. Referring back to FIG. 3, when slew drive assembly 10 is properly positioned on terminal end 80 of I-beam 70, the inwardly facing surface 52 of flange 50 and the inwardly facing surface 62 of flange 62 abut the outwardly facing surface of flanges 73 and 74, respectively. Apertures 55 align with apertures 75 and apertures 65 align with apertures 78. Slew drive apparatus 10 is securely fixed in position by fasteners 85, such as bolts and the like, extending concurrently through apertures 55 and 75, and apertures 65 and 78, and secured with nuts.

Figure 5:
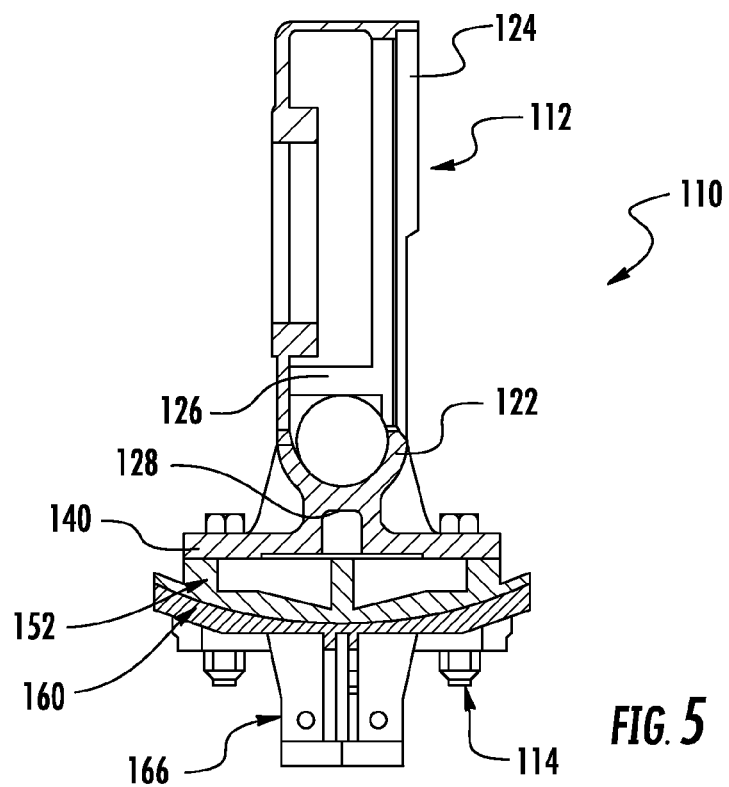
FIG. 5 is a sectional side view of a slew drive with spherical adjusting mount according to the present invention.
Figure 6:
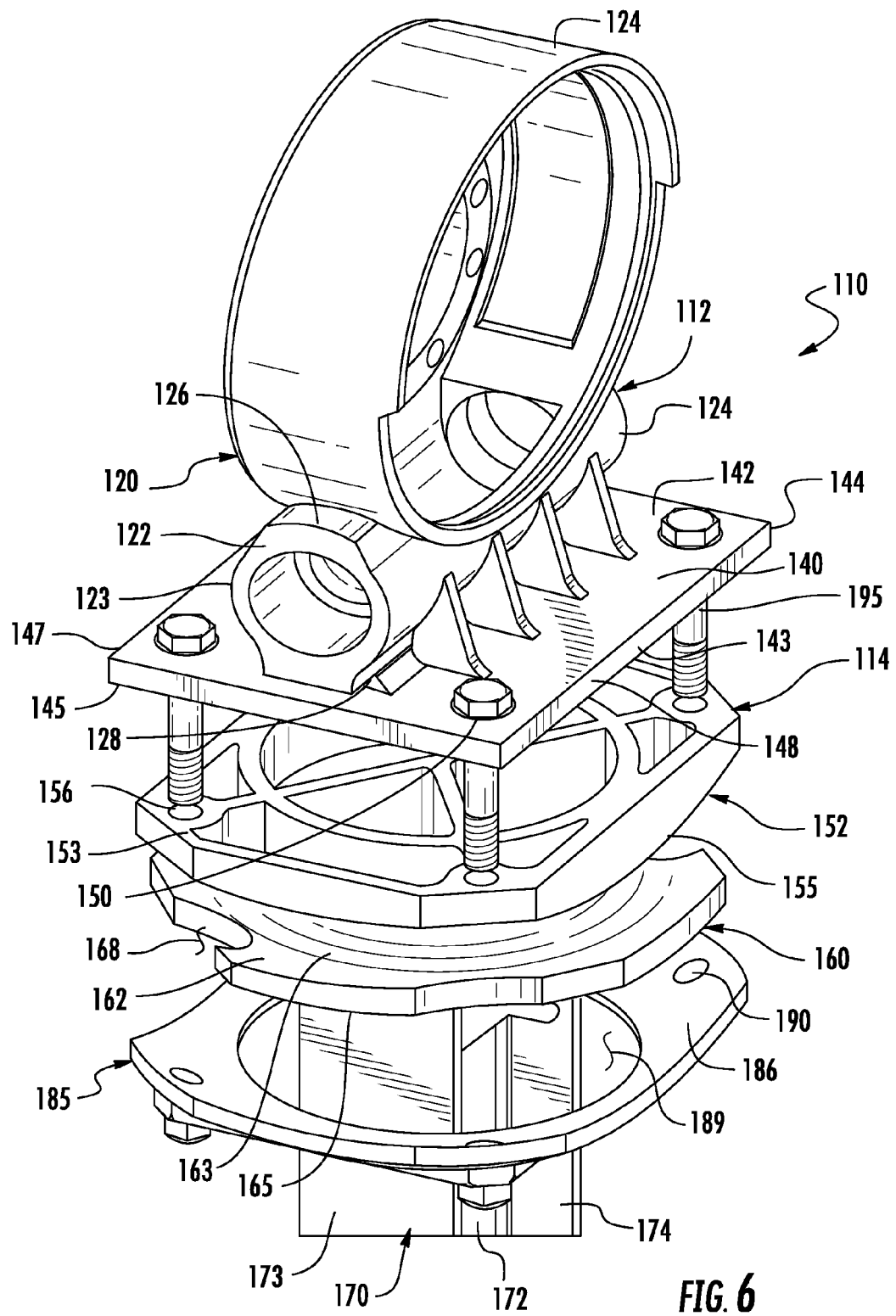
FIG. 6 is an exploded perspective view of the slew drive with spherical adjusting mount of FIG. 5.

Referring now to FIGS. 5 and 6, another embodiment of a slew drive assembly 110 is illustrated. Slew drive assembly 110 includes a slew drive 112 and a mounting structure 114. Slew drive 112 has been described in detail in co-pending application entitled "SLEW DRIVE GEARBOX WITH TORQUE TUBE" Ser. No. 14/489,462, filed Sep. 17, 2014 and incorporated herein by reference. Slew drive 112 includes a housing 120 having a tubular portion 122 and an annular portion 124. Tubular portion 122 has opposing ends 123 and 124, a top side 126 joined with annular portion 124, and a bottom side 128 opposite top side 126.

Still referring to FIGS. 5 and 6, mounting structure 114, in this embodiment is a spherical adjusting mount coupled to bottom side 128 of tubular portion 122. Mounting structure 114 includes a plate 140 having a top surface 142 a bottom surface 143, opposing ends 144 and 145, and opposing sides 147 and 148. Plate 140 is positioned with top surface 142 overlying bottom side 128. Sides 147 and 148 extend along the length of tubular portion 122 and terminate at ends 144 and 145 proximate ends 123 and 124, respectively. Plate 140 is attached to bottom side 128 of tubular portion 122 with fasteners such as bolts, screws, adhesives, welds and the like. It is also contemplated that plate 140 can be fabricated as an integral portion of housing 120. Plate 140 includes apertures 150, preferably formed at the corners thereof. Mounting structure 114 can include a modification of plate 140 to include bottom surface 143 formed as a convex surface forming a sphere section, or ,as illustrated, a form element 152 can be coupled to bottom surface 143. Form element 152 includes a top surface 153 overlying and engaging bottom surface 143 and a bottom surface 155 formed as a convex surface defining a sphere section. Form element 152 includes apertures 156, preferably formed at the corners thereof and aligned with apertures 150.

Figure 7:
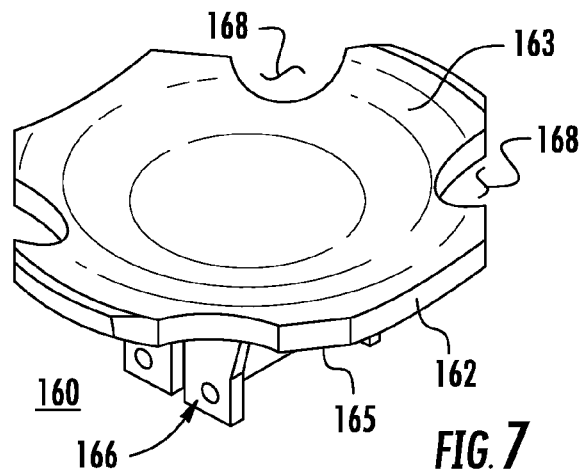
FIG. 7 is a perspective view of a sphere base of the spherical adjusting mount.
Figure 8:
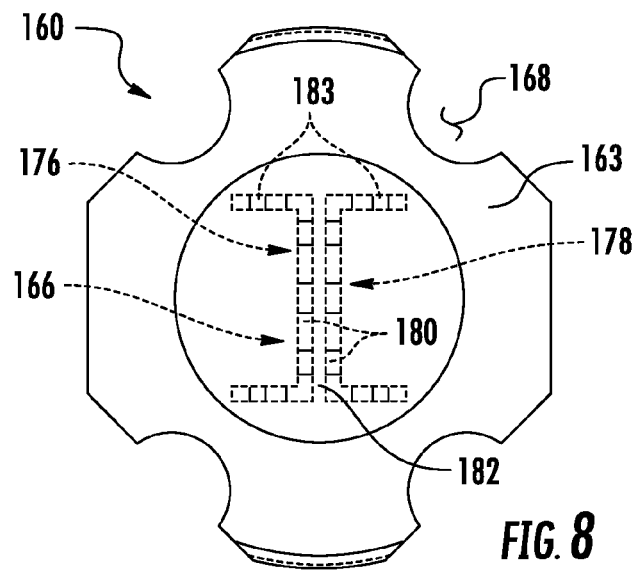
FIG. 8 is a top view of the sphere base of FIG. 7.

Slew drive 112 is coupled to a post, such as an I-beam, column, solid post tubular post, and the like, by a sphere base 160. With additional reference to FIGS. 7 and 8, sphere base 160 includes a base plate 162 having a concave top surface 163. Concave top surface 163 defines a sphere section substantially matching the sphere section of bottom surface 155 of form element 152. Base plate 162 includes a bottom surface 165, which in this embodiment is convex, matching the shape of top surface 163, from which a post coupling 166 extends. Cut-outs 168 are formed through base plate 162 and are spaced apart about a periphery thereof, preferably on opposing side. Base plate 162 is generally square, matching plate 140, with cut-outs 168 formed at corners thereof. In this preferred embodiment, post coupling 166 engages an I-beam 170. I-beam 170 includes a central web 172 and opposing side flanges 173 and 174 extending the length of opposing edges thereof. Post coupling 166 can be similar to flange 50 and flange 62 engaging the outer surfaces of flanges 173 and 174, as described in the previous embodiment, or can includes U-shaped flanges 176 and 178 (FIG. 8). U-Shaped flanges 176 and 178 each include a base length 180, separated by a space 182 for receipt of central web 172. U-Shaped flanges 176 and 178 further include leg lengths 183 extending perpendicularly from each end of base lengths 180 to lay adjacent opposing side flanges 173 and 174 of I-beam 170. Post coupling 166 can be secured in position by fasteners such as bolts, screws, clips and the like, adhesives, welding or other means as desired.

Figure 9:
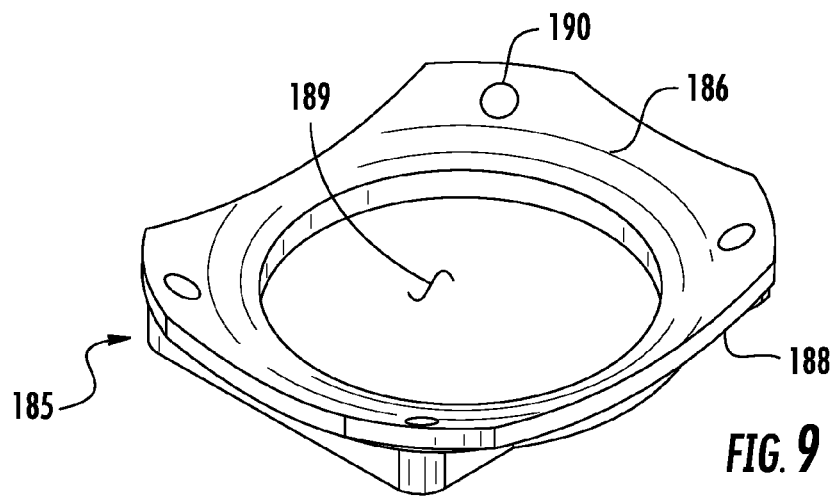
FIG. 9 is a perspective view of a clamp ring of the spherical adjusting mount.

Referring back to FIGS. 5 and 6, with additional reference to FIG. 9, mounting structure 114 further includes a clamp ring 185. Clamp ring 185 includes a top surface 186, a bottom surface 188, and defines a central opening 189 therethrough. Apertures 190 are formed through clamp ring intermediate an outer periphery and central opening 189, preferably at the four corners of clamp ring 185. In this preferred embodiment, top surface 186 is convex, matching the convex shape of bottom surface 165 of base plate 162. Central opening 189 receives I-beam 170 and mounting structure 114, therethrough.

With reference back to FIGS. 5 and 6, clamp ring 185 and plate 140 with form element 152, sandwich base plate 162 therebetween. Fastening members such as bolts 195 extend concurrently through apertures 150 of plate 140, apertures 156 of form element 152, cut-outs 168 of base plate 162, and apertures 190 of ring clamp 185. Mounting structure 114 is moveable between a clamped position and an unclamped position by tightening and loosening bolts 195. In the clamped position, form element 152 and ring clamp 185 are clamped tightly to base plate 162, fixedly securing slew drive 112 to I-beam 170. If the post is not perfectly vertical, or other adjustments need to be made to the positioning of slew drive 112, mounting structure 114 is moved to the unclamped position by loosening bolts 195. With mounting structure 114 in the unclamped position, the relative positioning of form element 152 and base plate 162 can be adjusted, with the spherical surfaces of each, acting as a socket to allow adjustment of the alignment or orientation of slew drive 112. The diameter of cut-outs 168, being larger than the diameter of bolts 195, give the clearance required to permit this relative adjustment. During adjustment, ring clamp 185 will be moved relative I-beam 170, thus central opening 189 must be large enough to accommodate the desired range of adjustment.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

The invention claimed is:

1. A slew drive with mounting structure comprising:
   a slew drive including a housing having a bottom side;
   a mounting structure comprising:
      a plate assembly coupled to the bottom side of the housing, the plate assembly having a bottom surface formed as a convex surface forming a sphere section;
      a base plate having a concave top surface defining a sphere section substantially matching the sphere section of the bottom surface of the plate assembly and adjustably receiving the sphere section of the bottom surface of the plate assembly, and the base plate having a convex bottom surface defining a sphere section;
      a post coupling carried by the base plate for coupling the base plate to a post; and
      a clamp ring having a central opening receiving the post coupling therethrough and having a concave top surface defining a sphere section substantially matching the sphere section of the bottom surface of the base plate and adjustably receiving the sphere section of the bottom surface of the base plate; and
      fasteners coupling the plate assembly and clamp ring, the fasteners movable between a clamp position preventing relative movement between the plate assembly, the clamp ring, and the base plate, and an unclamped position permitting relative movement between the plate assembly and the clamp ring, and the base plate.

2. A slew drive with mounting structure as claimed in claim 1 wherein the plate assembly includes a plate having a bottom surface and a form element having a top coupled to the bottom surface of the plate, the form element includes the bottom surface of the plate assembly.

3. A slew drive with mounting structure as claimed in claim 2 wherein the fasteners include:
   apertures formed in the plate;
   apertures formed in the form element aligned with the apertures formed in the plate;
   cut-outs formed in the base plate; adjustably aligned with the apertures formed in the form element;
   apertures formed in the ring clamp adjustably aligned with the cut-outs; and
   fastening members extending concurrently therethrough.

4. A slew drive with mounting structure as claimed in claim 3 wherein the cut-outs are formed in opposing sides of the periphery of the base plate and have a diameter larger than the diameter of the fastening members.

5. A slew drive with mounting structure as claimed in claim 4 wherein the fastening members are bolts.

6. A slew drive with mounting structure comprising:
   a post;
   a slew drive including a housing having a bottom side;
   a mounting structure mounting the slew drive to the post, the mounting structure comprising:
      a plate assembly coupled to the bottom side of the housing, the plate assembly having a bottom surface formed as a convex surface forming a sphere section;
      a base plate having a concave top surface defining a sphere section substantially matching the sphere section of the bottom surface of the plate assembly and adjustably receiving the sphere section of the bottom surface of the plate assembly, and the base plate having a convex bottom surface defining a sphere section;
      a post coupling carried by the base plate fixedly coupling the base plate to the post; and
      a clamp ring having a central opening receiving the post coupling and post therethrough and having a concave top surface defining a sphere section substantially matching the sphere section of the bottom surface of the base plate and adjustably receiving the sphere section of the bottom surface of the base plate; and
      fasteners coupling the plate assembly and clamp ring, the fasteners movable between a clamp position preventing relative movement between the plate assembly, the clamp ring, and the base plate, and an unclamped position permitting relative movement between the plate assembly and the clamp ring, and the base plate.

7. A slew drive with mounting structure as claimed in claim 6 wherein the plate assembly includes a plate having a bottom surface and a form element having a top coupled to the bottom surface of the plate, the form element includes the bottom surface of the plate assembly.

8. A slew drive with mounting structure as claimed in claim 7 wherein the fasteners include:
   apertures formed in the plate;
   apertures formed in the form element aligned with the apertures formed in the plate;
   cut-outs formed in the base plate; adjustably aligned with the apertures formed in the form element;
   apertures formed in the ring clamp adjustably aligned with the cut-outs; and
   fastening members extending concurrently therethrough.

9. A slew drive with mounting structure as claimed in claim 8 wherein the cut-outs are formed in opposing sides of the periphery of the base plate and have a diameter larger than the diameter of the fastening members.

10. A slew drive with mounting structure as claimed in claim 9 wherein the fastening members are bolts.

11. A slew drive with mounting structure comprising:
    a slew drive including a housing having a bottom side;
    a mounting structure comprising:
       a plate coupled to the bottom side of the housing, the plate having a bottom surface;
       a form element having a top coupled to the bottom surface of the plate, the form element including a bottom surface formed as a convex surface forming a sphere section;

a base plate having a concave top surface defining a sphere section substantially matching the sphere section of the bottom surface of the form element and adjustably receiving the sphere section of the bottom surface of the form element, and the base plate having a convex bottom surface defining a sphere section;

a post coupling carried by the base plate for coupling the base plate to a post; and a clamp ring having a central opening receiving the post coupling therethrough and having a concave top surface defining a sphere section substantially matching the sphere section of the bottom surface of the base plate and adjustably receiving the sphere section of the bottom surface of the base plate; and fasteners coupling the plate assembly and clamp ring, the fasteners movable between a clamp position preventing relative movement between the plate assembly, the clamp ring, and the base plate, and an unclamped position permitting relative movement between the plate assembly and the clamp ring, and the base plate.

12. A slew drive with mounting structure as claimed in claim 11 wherein the fasteners include:

apertures formed in the plate;

apertures formed in the form element aligned with the apertures formed in the plate;

cut-outs formed in the base plate; adjustably aligned with the apertures formed in the form element;

apertures formed in the ring clamp adjustably aligned with the cut-outs; and fastening members extending concurrently therethrough.

13. A slew drive with mounting structure as claimed in claim 12 wherein the cut-outs are formed in opposing sides of the periphery of the base plate and have a diameter larger than the diameter of the fastening members.

14. A slew drive with mounting structure as claimed in claim 13 wherein the fastening members are bolts.

* * * * *